(12) United States Patent
Triandopoulos et al.

(10) Patent No.: US 10,084,596 B1
(45) Date of Patent: *Sep. 25, 2018

(54) PROACTIVIZED THRESHOLD PASSWORD-BASED SECRET SHARING WITH FLEXIBLE KEY ROTATION

(71) Applicant: EMC IP Holding Company LLC, Hopkinton, MA (US)

(72) Inventors: Nikolaos Triandopoulos, Arlington, MA (US); Peter Robinson, Enoggera Reservoir (AU); Salah Machani, Thornhill (CA)

(73) Assignee: EMC IP Holding Company LLC, Hopkinton, MA (US)

( * ) Notice: Subject to any disclaimer, the term of this patent is extended or adjusted under 35 U.S.C. 154(b) by 245 days.

This patent is subject to a terminal disclaimer.

(21) Appl. No.: 14/962,606

(22) Filed: Dec. 8, 2015

(51) Int. Cl.
  *H04L 29/06* (2006.01)
  *H04L 9/30* (2006.01)
  *H04L 9/08* (2006.01)

(52) U.S. Cl.
  CPC .............. *H04L 9/0891* (2013.01); *H04L 9/08* (2013.01); *H04L 9/085* (2013.01); *H04L 9/30* (2013.01); *H04L 9/3093* (2013.01)

(58) Field of Classification Search
  CPC ..... H04L 9/3093; H04L 9/0869; H04L 9/008; H04L 9/30; H04L 9/08; H04L 63/083; H04L 9/0891; H04L 9/085
  See application file for complete search history.

(56) References Cited

U.S. PATENT DOCUMENTS 6,055,518 A * 4/2000 Franklin ............ G06Q 20/3674
  705/37
6,237,097 B1 * 5/2001 Frankel ................ G06Q 20/382
  380/277

(Continued)

OTHER PUBLICATIONS

Benaloh et al. Generalized Secret Sharing and Monotone Functions, in Proceedings on Advances in Cryptology, CRYPTO'88, pp. 27-35, New York, NY, USA, 1990. Springer-Verlag New York, Inc.

(Continued)

*Primary Examiner* — Mohammad A Siddiqi
(74) *Attorney, Agent, or Firm* — Ryan, Mason & Lewis, LLP

(57) ABSTRACT

Methods and apparatus are provided for proactivized threshold password-based secret sharing with key rotation. An exemplary method comprises determining a difference between updated and prior values of a share, wherein the updated value comprises a fixed share of a plurality of shares of a secret; setting at least one polynomial coefficient of a correction polynomial employed by a polynomial-based secret sharing scheme to a value that depends on the difference; applying the polynomial-based secret sharing scheme to obtain share correction values that comprise a share correction value for the fixed share derived from the at least one polynomial coefficient; and providing the share correction values to at least one party that generates the fixed share from the provided share correction value for the fixed share and the prior value of the share. The secret can optionally be updated. A key rotation scheduler optionally performs a new sharing of the secret based on a refreshing schedule and/or a refreshing policy.

25 Claims, 4 Drawing Sheets

---

PROACTIVIZATION OF PBSS PROCESS 400 FOR (3, 5) PBSS SCHEME:

1. PROCESS PASSWORD SHARE

2. INITIALIZE POLYNOMIAL

3. RANDOMIZE POLYNOMIAL

4. ESTABLISH SECRET-RECONSTRUCTION CONDITION

5. ESTABLISH FIXED-SHARE CONDITION

6. CORRECTION SHARES AND REFRESHED SHARING

(56) References Cited

U.S. PATENT DOCUMENTS

| | | | |
|---|---|---|---|
| 9,614,676 B1* | 4/2017 | El Defrawy | H04L 9/3218 |
| 9,813,243 B1* | 11/2017 | Triandopoulos | H04L 9/3093 |
| 9,813,244 B1* | 11/2017 | Triandopoulos | H04L 9/3093 |
| 2004/0030932 A1* | 2/2004 | Juels | H04L 63/083 |
| | | | 713/151 |
| 2004/0117649 A1* | 6/2004 | Whyte | H04L 9/085 |
| | | | 380/286 |
| 2016/0315921 A1* | 10/2016 | Dara | H04L 69/22 |
| 2017/0155634 A1* | 6/2017 | Camenisch | H04L 63/083 |

OTHER PUBLICATIONS

Herzberg et al. Proactive Secret Sharing or: How to Cope with Perpetual Leakage, in Advances in Cryptology—CRYPTO'95, 15th Annual International Cryptology Conference, Santa Barbara, California, USA, Aug. 27-31, 1995, Proceedings, pp. 339-352, 1995.

Ito et al. Secret Sharing Schemes Realizing General Access Structure, in Proceedings of the IEEE Global Telecommunication Conference, Globecom 1987, pp. 99-102, 1987.

Mitsuru et al. Multiple Assignment Scheme for Sharing Secret, Journal of Cryptology, 6(1):15-20, 1993.

Adi Shamir, How to Share a Secret, Commun. ACM, 22(11):612-613, Nov. 1979.

U.S. Appl. No. 14/319,276, filed Jun. 30, 2014, entitled "System and Method for Key Material Protection on Devices Using a Secret Sharing Scheme."

U.S. Appl. No. 14/577,206, filed Dec. 19, 2014, entitled "Protection of a Secret on a Mobile Device Using a Secret-Splitting Technique with a Fixed User Share."

U.S. Appl. No. 14/672,507, filed Mar. 30, 2015, entitled "Methods and Apparatus for Password-Based Secret Sharing Scheme."

* cited by examiner

FIG. 3

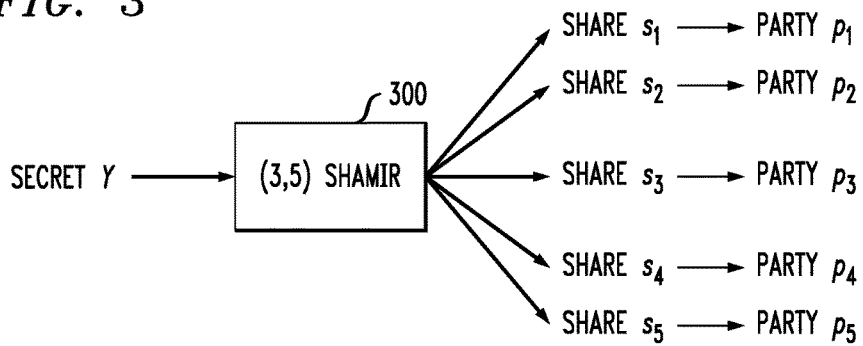

FIG. 4

PROACTIVIZATION OF PBSS PROCESS 400 FOR (3, 5) PBSS SCHEME:

1. PROCESS PASSWORD SHARE
2. INITIALIZE POLYNOMIAL
3. RANDOMIZE POLYNOMIAL
4. ESTABLISH SECRET-RECONSTRUCTION CONDITION
5. ESTABLISH FIXED-SHARE CONDITION
6. CORRECTION SHARES AND REFRESHED SHARING

FIG. 5

PROACTIVIZATION OF PBSS PROCESS 500 FOR $(t, n)$ PBSS SCHEME:

1. PROCESS FIXED SHARES
2. INITIALIZE POLYNOMIAL
3. RANDOMIZE POLYNOMIAL
4. EVALUATE CONDITIONS FOR SECRET RECONSTRUCTION AND FIXED SHARES
5. CORRECTION SHARES AND REFRESHED SHARING

PROACTIVIZED THRESHOLD PASSWORD-BASED SECRET SHARING WITH FLEXIBLE KEY ROTATION

CROSS-REFERENCE TO RELATED APPLICATIONS

The present application is related to U.S. patent application Ser. No. 14/319,276 (now U.S. Pat. No. 9,461,821), filed Jun. 30, 2014, entitled "System and Method for Key Material Protection on Devices Using a Secret Sharing Scheme;" U.S. patent application Ser. No. 14/577,206 (now U.S. Pat. No. 9,455,968), filed Dec. 19, 2014, entitled "Protection of a Secret on a Mobile Device Using a Secret-Splitting Technique with a Fixed User Share;" and U.S. patent application Ser. No. 14/672,507 (now U.S. Pat. No. 9,813,243), filed Mar. 30, 2015, entitled "Methods and Apparatus for Password-Based Secret Sharing Scheme," each incorporated by reference herein.

FIELD

The present invention relates to the protection of secret keys and other information in devices.

BACKGROUND

Secret sharing schemes comprise a cryptographic tool for implementing secure distributed protocols, allowing the splitting of a secret (typically, a cryptographic key) into a number of randomly produced pieces, or shares, and their dispersal to corresponding entities, during a secret sharing phase. This secret may become available again, during a secret reconstruction phase, only by combining a number of these shares that satisfy some well defined conditions. Shamir's Secret Sharing Scheme (see, e.g., A. Shamir, "How to Share a Secret." Communications of the Ass'n of Computer Machinery, Vol. 22, No. 11, 612-13 (1979)) is the most widely used secret sharing scheme, allowing secret reconstruction under threshold conditions.

In certain settings it is useful that one or more of the shares are chosen according to some external criteria (e.g., independently of the secret being split or the secret sharing method itself). Thus, techniques have been proposed or suggested for extending secret sharing schemes to support sharing of secrets into shares so that one or more shares take on some predetermined fixed values and not arbitrary values that are randomly chosen during the secret sharing phase. For example, U.S. patent application Ser. No. 14/577,206 (now U.S. Pat. No. 9,455,968), filed Dec. 19, 2014, entitled "Protection of a Secret on a Mobile Device Using a Secret-Splitting Technique with a Fixed User Share," incorporated by reference herein, discloses the use of "fixed shares" for enabling flexible reconstruction policies of keys split using Shamir's sharing scheme that allow for the use of one or more user-defined shares (e.g., a password) during key reconstruction. U.S. patent application Ser. No. 14/672,507 (now U.S. Pat. No. 9,813,243), filed Mar. 30, 2015, entitled "Methods and Apparatus for Password-Based Secret Sharing Scheme," incorporated by reference herein, describes threshold password-based secret sharing (or PBSS) schemes, where, during the secret sharing phase, one or more of the shares, into which a given secret is split, can take on some predetermined fixed values that can be provided as additional inputs to the secret sharing algorithm, without otherwise affecting the security of the scheme or its functionality during the secret reconstruction phase. Shares whose values depend on, or are fully specified by, criteria that are external to the shared secret (thus, taking on values that are predetermined and fixed prior to secret sharing), and therefore are typically independent of the shared secret, are generally referred to as fixed shares.

Nonetheless, a need remains for efficient proactivization techniques for threshold PBSS schemes that also allow updates of the split keys. A further need exists for general flexible key-rotation mechanisms for refreshment of secrets in the framework of password-based key splitting.

SUMMARY

Illustrative embodiments of the present invention provide methods and apparatus for proactivized threshold password-based secret sharing with key rotation. In one exemplary embodiment, a method comprises determining a difference between an updated value of a share and a prior value of the share for at least one party, wherein the updated value comprises a fixed share that is one of a plurality of shares of a secret, wherein the plurality of shares are held by a plurality of parties; setting at least one polynomial coefficient of a correction polynomial employed by a polynomial-based secret sharing scheme to a value that depends on the difference; applying the polynomial-based secret sharing scheme to obtain a plurality of share correction values, wherein the plurality of share correction values comprises a share correction value for the fixed share, wherein the share correction value is derived from the at least one polynomial coefficient; and providing the share correction values to at least one of the parties, wherein the at least one party generates the fixed share from the provided share correction value for the fixed share and the prior value of the share. In one or more embodiments, the fixed share is based on secret information related to the at least one party and/or a password of the at least one party.

In at least one embodiment, a plurality of differences are determined for a second plurality of shares held by a second plurality of parties that is a subset of the plurality of parties, wherein each of the differences of the plurality of differences comprises a difference between an updated value of a corresponding share in the second plurality of shares and a prior value of the corresponding share, wherein the updated values of the second plurality of shares comprise a plurality of fixed shares, wherein the setting step comprises setting a plurality of the correction polynomial coefficients in a manner that depends on the plurality of differences, wherein the plurality of share correction values comprises share correction values for the plurality of fixed shares that depend on the plurality of correction polynomial coefficients.

In at least one embodiment, at least one polynomial coefficient of the correction polynomial is set to a value that depends on a difference between an updated value of the secret and a prior value of the secret, wherein the plurality of share correction values depends on at least two of the polynomial coefficients, wherein at least one party generates a refreshed share from the provided share correction value, and wherein the at least one refreshed share corresponds to an updated secret defined by the updated value of the secret.

In at least one embodiment, the polynomial coefficients of the correction polynomial are set by a key rotation scheduler based on the differences determined for one or more of the updated value of the secret and one or more of the plurality of shares, wherein the plurality of correction shares and the at least one generated refreshed share comprise a new sharing of one or more of the secret and the updated secret.

The key rotation scheduler optionally performs the new sharing of the one or more of the secret and the updated secret based on a refreshing schedule. The refreshing schedule comprises independent schedules for each of the secret and the shares, indicating one or more of when the secret should be updated and when one or more of the shares should be refreshed.

The key rotation scheduler optionally performs the new sharing of the one or more of the secret and the updated secret based on a refreshing policy for the secret. The refreshing policy indicates whether the secret and the shares should take a particular value for a next sharing of the one or more of the secret and the updated secret corresponding to the polynomial-based secret sharing scheme. The secret comprises a cryptographic key and the new sharing comprises a rotation of the key and the shares. The refreshing policy optionally indicates that (i) one or more of rotated keys are interrelated through an unpredictable one-way cryptographic hash function; (ii) one or more fixed shares are used to encode information about a current state of the polynomial-based secret sharing scheme; (iii) next states in the polynomial-based secret sharing scheme are interrelated to prior states through a chaining of secret keys with the shares; and/or (iv) one or more shares rotate substantially immediately after a first use of the share for secret reconstruction.

Embodiments of the invention can be implemented in a wide variety of different devices and applications for the protection of key material or other protected material using proactivized threshold password-based secret sharing schemes.

BRIEF DESCRIPTION OF THE DRAWINGS

FIG. 3 illustrates an exemplary Shamir's (3,5) threshold scheme where secret Y is shared among a plurality of parties through an initial secret sharing;

FIGS. 4 and 5 are flow charts illustrating exemplary implementations of a proactivization process for a PBSS scheme;

DETAILED DESCRIPTION

Figure 1:
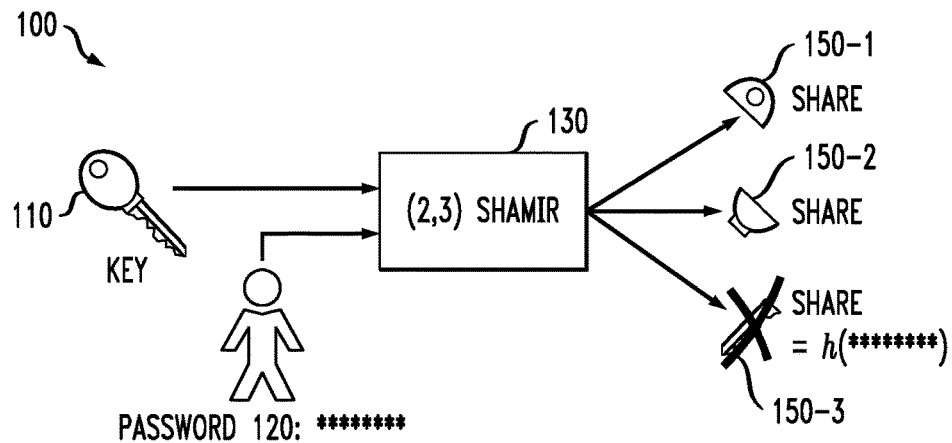
FIG. 1 illustrates an exemplary password-based secret sharing technique.

Illustrative embodiments of the present invention will be described herein with reference to exemplary communication systems and associated servers, clients and other processing devices. It is to be appreciated, however, that the invention is not restricted to use with the particular illustrative system and device configurations shown.

Aspects of the invention provide split-key based cryptography techniques for data protection and synchronization across multiple computing devices of a user. In one or more exemplary embodiments of the invention, split-key based cryptography techniques are employed for sensitive data protection, recovery and secure synchronization across multiple devices of a user. The user devices can include portable and/or non-portable computing devices, such as smartphones, tablets, desktop computers and/or laptop computers. In this manner, users can synchronize protected content across all or a subset of their devices.

One aspect of the present invention provides a proactivization technique for the threshold PBSS scheme described in U.S. patent application Ser. No. 14/672,507 (now U.S. Pat. No. 9,813,243), referenced above, that allows "incrementally" updating an initial sharing of a secret to a new refreshed sharing of the same secret where, in particular, one or more of the refreshed shares can be themselves fixed, that is, can take predetermined values. This technique is useful in highly dynamic environmentsgb where shares of a PBSS scheme must be refreshed frequently (proactively or retroactively due to suspected loss or leakage of shares to an attacker), so that the new sharing of the secret can optionally have one or more refreshed shares take predetermined values (e.g., a user's password or other user-defined data).

In highly adversarial environments, where an attacker actively seeks to learn the shares into which a secret key has been split (for instance, by compromising the devices storing such shares or by eavesdropping over communications transmitting such shares), it is desirable to periodically refresh not only the shares but also the secret key itself, so that the likelihood that the attacker learns a number of valid shares that is above the reconstruction threshold or, overall, the currently valid secret key is significantly reduced. Such refreshing of the secret key and its associated shares is collectively referred to as key rotation. Key rotation may trivially be performed by re-sharing a possibly new secret from scratch (e.g., using a new randomized polynomial for the case of Shamir's sharing) into a new set of shares and distributing the new shares to replace the old ones. That is, each party receiving a new share deletes its previously stored share and keeps the new one. However, such straightforward re-sharing is, in practice, less desirable since it typically requires secure reconstruction and processing of the secret itself as well as secure deletion of old shares.

Instead, it is more desirable to refresh the existing shares through proactivization: Here, assuming that the secret key remains unchanged, some randomized correction shares are computed (without knowledge of the split secret key), and such correction shares are distributed to parties holding the secret shares, where they are eventually individually combined with (e.g., added to) the existing shares to produce the refreshed shares. For instance, if a secret k is additively shared into shares $k_1$ and $k_2$, then the correction shares can be r and −r, where r is a random value, finally producing new shares $k_1+r$, $k_2-r$, which still correctly reconstruct the secret as $k_1+r+(k_2-r)=k_1+k_2=k$. Computation of the correction values can be performed by a trusted entity (i.e., the dealer) or jointly by the parties possessing the shares. For instance, in the example above, two correction values per share may be considered, namely, $r_1$, $r_2$ for $k_1$ and $-r_1$, $-r_2$ for $k_2$, where $r_1$, $r_2$ are randomly chosen by the parties holding respectively $k_1$ and $k_2$.

One or more embodiments of the present invention provide a general technique for key rotation for keys that are split into shares. In at least one exemplary embodiment, the secret key itself can be refreshed (or updated). The generalized proactivized threshold PBSS can be employed to realize a flexible key-rotation scheduling framework where each secret (key and/or fixed/non-fixed share) in a key-splitting system is individually and independently of each other refreshed according to a fixed (or dynamic) schedule.

Secret Sharing Schemes

A secret sharing scheme is a pair of algorithms (Share, Rec) that allow the sharing of a secret Y into a number of shares, or sharing, $S=\{s_1,s_2,\ldots,s_n\}$, which are distributed to a number of entities, or parties, $P=\{p_1,p_2,\ldots,p_{n'}\}$, $n' \geq n$, so that each party collectively receives at least one share, such that reconstruction of secret Y is allowed from at least one subset of shares, only under certain conditions on this subset being met. Such conditions on subsets of shares that allow secret reconstruction may depend on the subset size or generally on the exact members of the subset, i.e., on the exact combination of shares and, therefore, on a corresponding combination of parties. These conditions are typically expressed by an access structure (AS) that characterizes the exact subsets of shares, or corresponding subset of parties, that allow reconstruction of the secret for a given scheme. Any such subset in the access structure of a scheme is often called an authorized set of shares or parties. Then, a secret sharing scheme should necessarily limit secret reconstruction only to authorized sets in its access structure and disallow secret reconstruction from any subset of shares or parties not in its access structure.

Generally, a secret sharing scheme can support an arbitrary such set of conditions defined by an access structure AS containing authorized sets of parties that result from any set-operation formula over the parties in $P=\{p_1,p_2,\ldots,p_{n'}\}$. For instance, $$AS=\{\{p_1 \cup p_2\},\{(p_1 \cup p_2 \cup p_3) \cap (p_2 \cup p_3 \cup p_4)\}\}.$$

Often, for secret sharing to be more efficient and secret reconstruction conditions to be meaningful, the access structure should be expressed by a monotone formula, so that, for instance, if subset $\{p_2,p_3\}$ is included in AS, then all proper supersets of it are also included. It is noted that there is little value and no security justification for a scheme to allow reconstruction for authorized set $\{p_2,p_3\}$, but disallow reconstruction once a new member $p_4$ is added in this set; for example, the unauthorized set $\{p_2,p_3,p_4\}$ would trivially (and insecurely) become authorized by silently excluding party $P_4$ from secret reconstruction. For a monotone access structure, an authorized set $A_i$ is called minimal if any proper subset of $A_i$ is not an authorized set. For instance, set $\{p_2, p_3\}$ in the above example is minimal when the access structure additionally requires at least two parties for secret construction.

Threshold Schemes

Threshold secret sharing schemes are special schemes with corresponding access structures where reconstruction depends only on the number of available parties (or combined shares), namely by including only authorized sets of size at least a given threshold value. Specifically, in a typical (t,n) or t-out-of-n secret sharing scheme, $2 \leq t \leq n$, the secret is split into n shares where each party $p_i$ is provided with exactly one share $s_i$, and secret reconstruction is allowed by any set of parties (equivalently, set of shares) of size t or more, that is, any set reaching a size of the reconstruction threshold value t.

Shamir's Secret Sharing Scheme is the most widely used threshold scheme and is based on polynomials. Here, given a secret Y in the appropriate range, a random polynomial $f(\cdot)$ of degree t−1 is chosen by selecting randomly and independently t−1 polynomial coefficients so that $f(0)=Y$, where arithmetic modulo a (large) prime of an appropriate length is used to evaluate the polynomial, and the produced sharing takes the form $S=\{s_i=(i,f(i))|i \in [1:n]\}$. Then, secret reconstruction is allowed through polynomial interpolation (and evaluation of $f(0)$) for any subset of shares of size at least t, based on the fact that any k points uniquely define a polynomial of degree (at most) k−1 passing through all these points. Shamir's scheme is both ideal (that is, each share is of size exactly the size of the secret), and perfectly private (that is, any unauthorized set of at most t−1 shares learns nothing about the secret in an information-theoretic sense).

Overall, existing secret sharing schemes generally produce shares that are randomly and independently selected other than satisfying the final secret reconstruction condition.

Password-Based Secret Sharing Schemes

U.S. patent application Ser. No. 14/577,206 (now U.S. Pat. No. 9,455,968), and U.S. patent application Ser. No. 14/672,507 (now U.S. Pat. No. 9,813,243), both referenced above, describe password-based secret sharing (or PBSS) schemes. U.S. patent application Ser. No. 14/577,206 (now U.S. Pat. No. 9,455,968), for example, describes a password-based key splitting scheme for user credential protection in mobile computing settings. Generally, one cryptographically strong key is employed for protecting sensitive data, where this key is split into two or more shares dispersed among a set of devices, such as mobile devices, smart objects and/or online servers. Access to data protected by such a split key is granted only through the reconstruction of this split key, where (typically for security and usability reasons) one of the employed shares can receive a fixed value which is associated with or derived by some predetermined, possibly private, information related to the user (e.g., a password). For instance, if Shamir's (t,n) threshold secret sharing scheme is used for splitting the key into n shares, a combination of any t, or more, such shares is necessary to reconstruct the key, but now one of the shares may be user-defined and provided directly by the user. Overall, both security and usability are improved by leveraging splitting of a cryptographic key into a number of individually managed and protected shares, to provide stronger resilience against device compromises and state leakage, and by associating at least one of these shares with a user password (or personal identification number (PIN) or another user-defined secret), to allow reconstruction of the split key conditioned on the knowledge of such password (or other user-defined secret information).

U.S. patent application Ser. No. 14/672,507 (now U.S. Pat. No. 9,813,243) provides a threshold password-based secret sharing (PBSS) scheme that is an extension of Shamir's sharing scheme that securely supports fixed shares, i.e., it allows for one or more shares to be selected according to some predetermined values.

Both PBSS schemes satisfy the following property: During the sharing phase, one or more of the shares, into which a given secret is split, can take on some predetermined fixed values that can be provided as additional inputs to the secret sharing algorithm, without otherwise affecting the security of the scheme or its functionality during the secret reconstruction phase. Notably, using the design framework of U.S. patent application Ser. No. 14/577,206 (now U.S. Pat. No. 9,455,968), referenced above, these PBSS schemes find application to credential protection in mobile settings, as mentioned above. Without a PBSS scheme, no such association is possible, since conventional (non-password based) schemes split a secret into a number of shares that are all completely random, thus not allowing setting any share to a predetermined fixed user-defined value.

The threshold PBSS scheme, as discussed further below in conjunction with FIG. 1, is an extension of Shamir's (t,n) threshold Secret Sharing Scheme that allows the secure selection of one or more shares, called fixed shares, in accordance with a set of corresponding predetermined fixed values, which are provided as additional inputs to the secret sharing algorithm. In one more more exemplary embodiments, the selected fixed shares are fully consistent with the secret reconstruction condition and the extended scheme remains both ideal and perfectly private. This is in direct contrast of the standard Shamir's scheme, where all shares are randomly selected only subject to the secret reconstruction condition $f(0)=Y$. By introducing one or more (up to an upper bound that depends on n and t) fixed shares in Shamir's (t,n) scheme, the construction appropriately adjusts the underlying polynomial in a way that maintains the consistency between the fixed shares and the secret reconstruction condition, while keeping its ideal sharing and perfect privacy properties. The selection of fixed shares (according to corresponding predetermined fixed values) is traded with a corresponding adjustment of the polynomial coefficients. In one or more exemplary embodiments, such adjustments are performed to maintain the scheme's secure configuration, that is, to ensure that the secret remains both reconstructable and perfectly hidden from any below-the-threshold coalition. Specifically, every additional fixed share that is introduced in the scheme is "tolerated," with respect to the two goals of secret reconstruction and perfect privacy, by appropriately setting a corresponding polynomial coefficient to a particular value that depends on the fixed share.

Consider Shamir's (3,5), as discussed further below in conjunction with FIG. 3, threshold scheme where secret Y is shared among parties $P=\{p_1,p_2,p_3,p_4,p_5\}$ through sharing $S=\{s_1,s_2,s_3,s_4,s_5\}$, where any three or more shares suffice to reconstruct Y, but no pair of shares alone. Let p be the prime order of the finite field Z over which the polynomials in Shamir's scheme are defined, where $Y<p$. Assume a desire to support selection of one predetermined fixed share, say $s_1$, that is associated with party's $p_1$ secret information. For instance, a password $\pi$ is first selected by party $p_1$ and then the associated share $s_1$ is computed by applying an appropriate transformation function, e.g., mapping a to an element in $Z_p$. Shamir's scheme is extended as follows, so that $s_1$ can be securely associated with $\pi$ and, at the same time, the scheme remains ideal and perfectly private:

1. Password Share: Map password $\pi$ to an element $\Pi=h(\pi) \in Z_p$ by applying an appropriate compressed-range function $h:\{0,1\}^* \to \{Z_p\}$. Here, function h may be a cryptographic collision-resistant hash function h or an appropriate key derivation function.

2. Polynomial Initialization: Initiate an underlying polynomial f of degree most 2 as follows:

$f(x)=a_0+a_1x+a_2x^2 \mod p$.

3. Polynomial Randomization: Choose a random integer $a_2<p$ from $Z_p$, i.e., $a_2 \xleftarrow{\$} Z_p$.

4. Secret-Reconstruction Condition: Set $a_0=Y$.

5. Fixed-Share Condition: Choose $a_1$ such that $f(1)=\Pi$, or $\Pi=a_0+a_1+a_2 \mod p$, that is, set $a_1=\Pi-Y-a_2 \mod p$.

6. Final Sharing: Produce shares as $S=\{(i,f(i))|i \in [1:5]\}$, where the coefficients $a_0$, $a_1$ and $a_2$ of polynomial $f(x)=a_0+a_1x+a_2x^2 \pmod p$ are set as above.

In the general case, the PBSS scheme supports selection of k fixed shares (where k is appropriately bounded as described below), say shares $\{s_{I_1},s_{I_2},\ldots,s_{I_k}\} \subset S$, where each such share $s_{I_j}$ is associated with party's $p_{I_j}$ secret information or password $\pi_{I_j}$, as shown below:

1. Fixed Shares: Choose (possibly randomly) k indices $I=\{I_1,I_2,\ldots,I_k\} \subset [1:n]$ that will correspond to the fixed shares, where $0 \le k \le t-1$. For each $I_j \in I$, map password $\pi_{I_j}$ to an element $\Pi_{I_j}=h(\pi_{I_j}) \in Z_p$ by applying an appropriate compressed-range function $h:\{0,1\}^* \to \{Z_p\}$. Here, function h may be a cryptographic collision-resistant hash function h or an appropriate key derivation function.

2. Polynomial Initialization: Initiate an underlying polynomial f of degree at most $t-1$ as follows:

$f(x)=a_0+a_1x+\ldots+a_{t-1}x^{t-1} \mod p$.

3. Polynomial Randomization: Choose independently at random $t-k-1>0$ integers $a_{k+1},\ldots,a_{t-1}$ from $Z_p$, i.e., $a_t \xleftarrow{\$} Z_p$, for $i \in [k+1:t-1]$.

4. Evaluation Conditions:
   (a) Form set of equations $E=\{E_0,E_2,\ldots,E_k\}$, each of the form $$Y_x = f(x) = a_0 + \sum_{1 \le i \le t-1} a_i x^i \mod p,$$

in 1-1 correspondence to the following conditions on:
   Secret-reconstruction: $Y=f(0) \triangleq Y_0$;
   Fixed-shares: $\Pi_{I_j}=f(I_j) \triangleq Y_{I_j}$, for each index in $\{I_1, I_2, \ldots, I_k\}$.
   (b) View equations E as system $Y=A \cdot I$, where $Y=[Y_0, Y_{I_1} \ldots Y_{I_k}]^T$, $I=[a_0\ a_1\ \ldots\ a_k]^T$ and A takes the form $A=[RS]$ as matrix:

$$A = \begin{bmatrix} 1 & 0 & \ldots & 0 & \ldots & 0 \\ 1 & I_1 & \ldots & I_1^k & \ldots & I_1^{t-1} \\ \vdots & & & & & \\ 1 & I_k & \ldots & I_k^k & \ldots & I_k^{t-1} \end{bmatrix},$$

set $\tilde{I}=[a_{k+1}\ a_{k+2}\ \ldots\ a_{t-1}]^T$ and finally set $I=R^{-1} \cdot (Y-S \cdot \tilde{I})$.

5. Final Sharing:
   (a) Produce shares as $S=\{s_i \triangleq (i,f(i))|i \in [1:n]\}$, where the coefficients $a_0$, $a_1$, $\ldots$ $a_{t-1}$ of polynomial $f(x)=a_0+a_1x+\ldots+a_{t-1}x^{t-1} \mod p$ are set as above (in steps 3 and 4(b)).
   (b) Provide party $p_i$ with share $(s_i)=(i,f(i))$.

The password-based secret sharing algorithm above follows the structure of the previously discussed example. The underlying polynomial f(x) is fully defined by t equations $E'=E \cup \{E_{k+1},E_{k+2},\ldots,E_{t-1}\}$, of the form as in step 4(a), which can be viewed as system $[Y\bar{Y}]^T=[A\bar{A}]^T \cdot [\tilde{\Pi}]^T$, where $\bar{Y}=[Y_{k+1}\ Y_{k+2}\ \ldots\ Y_{k-1}]^T$, $$\bar{A} = \begin{bmatrix} 1 & I_{k+1} & \ldots & I_{k+1}^k & \ldots & I_{k+1}^{t-1} \\ 1 & I_{k+2} & \ldots & I_{k+2}^k & \ldots & I_{k+2}^{t-1} \\ \vdots & & & & & \\ 1 & I_{t-1} & \ldots & I_{t-1}^k & \ldots & I_{t-1}^{t-1} \end{bmatrix},$$

and Ī as defined above in step 4(b). Then, step 3 randomly sets t−k−1 coefficients (the remaining degrees of freedom of the randomness of the scheme given the k+1 conditions related to secret reconstruction and fixed shares) and step 4(b) essentially solves the system by computing the remaining k+1 unspecified coefficients in I. Note that matrix R is invertible as a Vandermonde matrix. This proves the correctness of the scheme.

Moreover, it is possible to show that the threshold scheme above is also perfectly private. Intuitively, an attacker holding t−1 points of the polynomial f(x) will determine, for each candidate secret Y', a unique polynomial f'(x) (that depends on Y, Y' and all fixed shares/passwords), and each one of these p polynomials can occur with the same probability $1/p^{t-k-1}$.

FIG. 1 illustrates an exemplary password-based secret sharing technique 100. As noted above, the PBSS scheme is an extension of Shamir's (t,n) threshold Secret Sharing Scheme that allows the secure selection of one or more shares, called fixed shares, in accordance with a set of corresponding predetermined fixed values, which are provided as additional inputs to the secret sharing algorithm.

As shown in FIG. 1, a key 110 (or other secret information) and a user password 120 are applied to a Shamir secret sharing scheme 130, such as a (2, 3) scheme. The exemplary (2, 3) scheme splits the exemplary key 110 into three shares. In the embodiment of FIG. 1, the key 110 is split into two non-fixed shares 150-1 and 150-2 and one fixed share 150-3, referred to as a password share. The password share 150-3 is obtained, for example, by applying a hash function, h, to the user password 120. The password share 150-3 is typically not explicitly stored.

Proactivization of PBSS (ProPBSS)

Generally, proactivization schemes aim to refresh the shares 150 in current sharing while maintaining the same secret (key) 110. In one or more exemplary embodiments, the disclosed proactivization techniques employ the generation of a set of correction shares (e.g., one for each party in the sharing), which are individually added to the set of existing shares in a PBSS sharing to eventually refresh the sharing to a new one. The correction shares are defined by a corresponding correction polynomial g(•). Proactivizing an initial sharing $(s_1, \ldots, s_n)$ of the standard version of a (t,n) threshold Shamir scheme amounts to randomly choosing polynomial g(•), subject to the condition g(0)=0, and then setting the refreshed new sharing $(g(1)+s_1, \ldots, g(n)+s_n)$, that is, perturbing each existing share $s_i$ by adding a random offset g(i) (see, e.g., Amir Herzberg et al., "Proactive Secret Sharing or: How to Cope with Perpetual Leakage," Advances in Cryptology—CRYPTO '95, Proc. 15th Annual Int'l Cryptology Conf., 339-352 (Aug. 27-31, 1995)).

In the case of password-based secret sharing, however, the proactivization method is modified to allow support of fixed refreshed shares. Specifically, a polynomial g(•) is selected to generate one or more correction shares that when combined with the corresponding existing shares produce refreshed shares that take fixed predefined values. By design, inspired by the partial polynomial randomization technique in U.S. patent application Ser. No. 14/672,507 (now U.S. Pat. No. 9,813,243), referenced above, where the chosen polynomial is random subject to one or more conditions related to the fixed shares, we define the correction polynomial g(•) by conditioning on the set of desired predetermined values that the fixed refreshed shares must take.

Note that generally the set of fixed refreshed shares may be different from the set of fixed initial shares.

Figure 2:
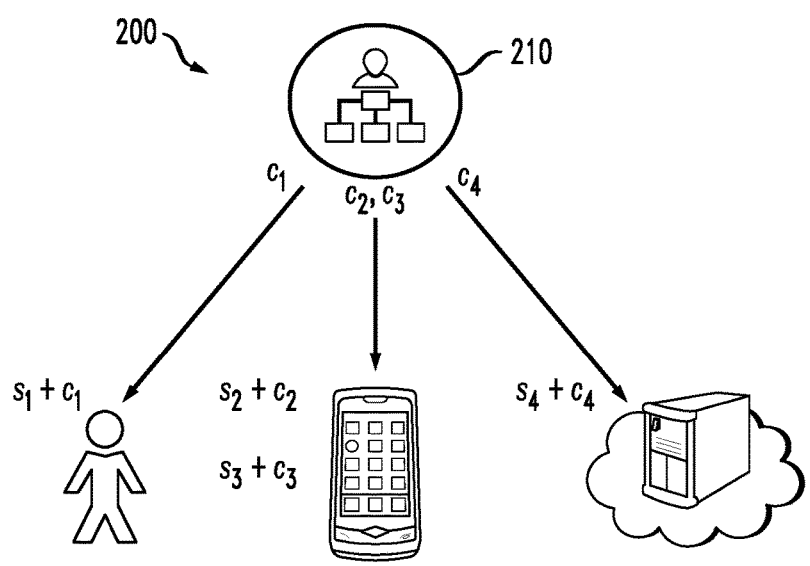
FIG. 2 illustrates an exemplary technique for proactivization of PBSS (ProPBSS) in accordance with one or more embodiments of the invention.

FIG. 2 illustrates an exemplary technique 200 for proactivization of PBSS (ProPBSS). As shown in FIG. 2, a trusted entity 210 computes one or more correction shares, such as correction shares $c_1$ through $c_4$, that when combined with the corresponding existing shares 150, such as existing shares $s_1$ through $s_4$, produce refreshed shares that take fixed predefined values. The trusted entity 210 reliably selects the randomness used to generate the correction shares $c_1$ through $c_4$.

The exemplary proactivization method is first described in reference to the concrete (3, 5) PBSS scheme described above and then the technique is generalized to the (t,n) case.

FIG. 3 illustrates an exemplary Shamir's (3,5) threshold scheme 300, where secret Y is shared among parties $P=\{p_1, p_2, p_3, p_4, p_5\}$ through initial sharing $S=\{s_1, s_2, s_3, s_4, s_5\}$, and where any three or more shares suffice to reconstruct Y, but no pair of shares alone. Let p be the prime order of the finite field $Z_p$ over which the polynomials in Shamir's scheme are defined, where Y<p. Assume that $s_1$ has been selected as a fixed share Π that is associated with secret information π of party $p_1$. The goal is to proactivize sharing S to a refreshed sharing S' such that (without loss of generality) $p_1$'s refreshed share $s_1'$ remains the same, i.e., $s_1'=s_1$ (Case I) or it is updated to a fixed refreshed share Π' that is associated with new secret information of party $p_1$, π', i.e., $s_1'=h(\pi')=\Pi'$ (Case II) for some appropriate compressed-range function $h:\{0,1\}^* \to (Z_p)$. (Note that Case I is a special case of Case II, but for clarity both cases are described.)

FIG. 4 is a flow chart illustrating an exemplary implementation of a process 400 for proactivization of PBSS for the exemplary (3, 5) PBSS scheme. As shown in FIG. 4, the exemplary process 400 comprises the following steps:

1. Password Share: Map password π' to an element $\Pi=h(\pi') \in Z_p$ by applying an appropriate compressed-range function $h:\{0,1\}^* \to \{Z_p\}$. Here, function h may be a cryptographic collision-resistant hash function h or an appropriate key derivation function.

2. Polynomial Initialization: Initiate an underlying correction polynomial g of degree most 2 as follows:

$$g(x)=b_0+b_1x+b_2x^2 \bmod p.$$

3. Polynomial Randomization: Choose a random integer $b_2 < p$ from $Z_p$, i.e., $b_2 \xleftarrow{\$} Z_p$.

4. Secret-Reconstruction Condition: Set $b_0=0$.

5. Fixed-Share Condition: Choose $b_1$ such that $g(1)=\delta_1$, the correction or offset of $p_1$'s share, or $\delta=b_0+b_1+b_2 \bmod p$, that is, set $$b_1=\delta_1-b_2 \bmod p.$$

In Case I, it is $\delta_1=0$ so $b_1=-b_2$. In Case II, it is $\delta_1=\Pi-h(\pi)$ so $b_1=\Pi'-h(\pi)-b_2$.

6. Correction Shares and Refreshed Sharing: Produce correction shares as follows:

$$C=\{(g(i)|i \in [1:5]\},$$

where the coefficients $b_0$, $b_1$ and $b_2$ of polynomial $g(x)=b_0+b_1x+b_2x^2 \pmod p$ are set as above. Privately communicate correction share g(i) to party $p_i$. Finally, party $p_i$ refreshes its share $s_i$ to a new share $$s_i+g(i) \bmod p.$$

It is noted that, indeed, the fixed refreshed share of party $p_1$ now becomes $\Pi-b_2+b_2=\pi$, in Case I, or $\Pi+\Pi'-h(\pi)-b_2+b_2=\Pi'$, in Case II (since $\Pi=h(\pi)$).

In the general (t,n) case, the proactivized PBSS scheme for secret y supports selecting k shares (where k is appropriately bounded as described below), say shares $\{s_{I_1}, s_{I_2}, \ldots, s_{I_k}\} \subset S$, to be refreshed to fixed predetermined values, say $\{s'_{I_1}, s'_{I_2}, \ldots, s'_{I_k}\} \subset S'$, where each such new share $s'_{I_j}$ is associated with party's $p_{I_j}$ secret information or password $\pi'_{I_j}$.

FIG. 5 is a flow chart illustrating an exemplary implementation of a process 500 for proactivization of PBSS for the general (t, n) PBSS scheme. As shown in FIG. 5, the exemplary process 500 comprises the following steps:

1. Fixed Shares: Choose (possibly randomly) k indices $I=\{I_1,I_2, \ldots, I_k\} \subset [1:n]$ that will correspond to the fixed refreshed shares, where $0 \le k \le t-1$. For each $I_j \in I$, map password $\pi'_{I_j}$ to an element $['_{I_j} = h(\pi'_{I_j}) \in Z_p$ by applying an appropriate compressed-range function $h:\{0,1\}^* \to \{Z_p\}$. Here, function h may be a cryptographic collision-resistant hash function h or an appropriate key derivation function.

2. Polynomial Initialization: Initiate an underlying correction polynomial g of degree at most t−1 as follows:

$$g(x) = b_0 + b_1 x + \ldots + b_{t-1} x^{t-1} \bmod p.$$

3. Polynomial Randomization: Choose independently at random t−k−1>0 integers $b_{k+1}, \ldots, b_{t-1}$ from $Z_p$, i.e., $b_i \xleftarrow{\$} Z_p$, for $i \in [k+1:t-1]$.

4. Evaluation Conditions:
   (a) Form set of equations $E=\{E_0, E_2, \ldots, E_k\}$, each of the form $$A = \begin{bmatrix} 1 & 0 & \ldots & 0 & \ldots & 0 \\ 1 & I_1 & \ldots & I_1^k & \ldots & I_1^{t-1} \\ \vdots & & & & & \\ 1 & I_k & \ldots & I_k^k & \ldots & I_k^{t-1} \end{bmatrix},$$

in one-to-one correspondence to the following conditions on:

Secret-reconstruction: $0 = g(0) \triangleq \delta_0$;
Fixed-shares: $\Pi'_{I_j} - s_{I_j} = g(I_j) \triangleq \delta_{I_j}$, for each index in $\{I_1, I_2, \ldots, I_k\}$.

The secret-reconstruction condition ensures that the secret is not updated.

(b) View equations E as system $\Delta = A \cdot I$, where $\Delta = [\delta_0 \; \delta_{I_1} \ldots \delta_{I_k}]^T$, $I = [b_0 \; b_1 \ldots b_k]^T$ and A takes the form $A = [R \; S]$ as matrix $$A = \begin{bmatrix} 1 & 0 & \ldots & 0 & \ldots & 0 \\ 1 & I_1 & \ldots & I_1^k & \ldots & I_1^{t-1} \\ \vdots & & & & & \\ 1 & I_k & \ldots & I_k^k & \ldots & I_k^{t-1} \end{bmatrix},$$

set $\bar{I} = [b_{k+1} \; b_{k+2} \ldots b_{t-1}]^T$ and finally set $$I = R^{-1} \cdot (\Delta - S \cdot \bar{I}).$$

5. Correction Shares and Refreshed Sharing:
   (a) Produce correction shares as $$C = \{g(i) | i \in [1:n]\},$$

where the coefficients $b_0, b_1, \ldots, b_{t-1}$ of polynomial $g(x) = b_0 + b_1 x + \ldots + b_{t-1} x^{t-1} \bmod p$ are set as above (in steps 3 and 4(b)).

(b) Privately communicate correction share g(i) to party $p_i$.
   (c) Party $p_i$ refreshes its share $s_i$ to new share $$s_i + g(i) \bmod p.$$

Similarly to the original PBSS scheme, the underlying polynomial g(x) is fully defined by t equations $E' = E \cup \{E_{k+1}, E_{k+2}, \ldots, E_{t-1}\}$ of the form as in step 4(a), which can be viewed as system $$[\Delta \bar{\Delta}]^T = [A \bar{A}]^T \cdot [I I]^T,$$

where $\bar{\Delta} = [\delta_{k+1} \; \delta_{k+2} \ldots \delta_{k-1}]^T$, $$\bar{A} = \begin{bmatrix} 1 & I_{k+1} & \ldots & I_{k+1}^k & \ldots & I_{k+1}^{t-1} \\ 1 & I_{k+2} & \ldots & I_{k+2}^k & \ldots & I_{k+2}^{t-1} \\ \vdots & & & & & \\ 1 & I_{t-1} & \ldots & I_{t-1}^k & \ldots & I_{t-1}^{t-1} \end{bmatrix},$$

and $\bar{I}$ as defined above in step 4(b). Then, step 3 randomly sets t−k−1 coefficients (the remaining degrees of freedom of the randomness of the scheme given the k+1 conditions related to secret reconstruction and fixed shares), and step 4(b) essentially solves the system by computing the remaining k+1 unspecified coefficients in I. Note that matrix R is invertible as a Vandermonde matrix. This proves the correctness of our scheme.

It is noted that, since the proactivization procedure refreshes shares by adding random or appropriately chosen (based on a predetermined value) offset values to an existing sharing, the offset $\delta_i$ of any fixed refreshed share $s'_i$ must be defined with respect to the initial share $s_i$ as $\delta_i = s'_i - s_i$. Thus, the initial share of any fixed refreshed share must be known in advance or computed (through standard secret reconstruction).

Flexible Key Rotation Via ProPBSS

In the following discussion, the existence of a trusted dealer is assumed which initiates the process of key rotation at specific points in time.

Generalized Proactivized PBSS

The proactivization of the PBSS scheme described above can optionally be extended using a Generalized Proactivized PBSS (GenProPBSS) scheme to also allow for secret (key) updates (or refreshing). This can be achieved by modifying the secret reconstruction condition, $$g(0) = 0,$$

For the definition of the correction polynomial g(•) to the new condition, $$g(0) = \delta_0,$$

where $\delta_0$ is the offset by which the secret key needs to be updated. That is, if current secret k is to be updated to a new value k', then $\delta_0 = k' - k \bmod p$. Note that this extension assumes knowledge of both the current (existing) and the new (updated) value of the secret. For instance, the dealer may perform a secret reconstruction to learn the value k before proceeding with the key update. This extension is referred to as generalized proactivized password-based secret sharing, or GenProPBSS for short.

Key Rotation Framework

Figure 6:
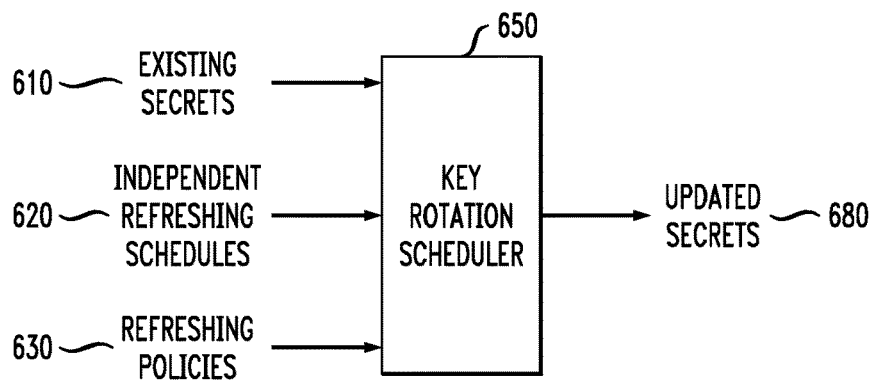
FIG. 6 illustrates a key rotation framework in accordance with one or more embodiments of the invention.

FIG. 6 illustrates a key rotation framework 600 comprising a set of independent refreshing schedules 620, one for each secret value in the key splitting system, (optionally) a set of refreshing policies 630 that specify certain key rotation types that improve security and usability, and a key rotation scheduler 650. The key rotation scheduler 650 executes rotation of existing secrets 610 according to the refreshing schedules 620 and policies 630 to generate updated secrets 680 by employing GenProPBSS in parallel across any overlapping such schedules. Details follow.

Refreshing Schedules 620. Consider an initial sharing $S_0=(s_{0,1},s_{0,2},\ldots,s_{0,n})$ of secret $k_0$ into a fixed number of shares n. The n+1 secret values $k_0=s_{0,0}$ and $s_{0,1},s_{0,2},\ldots,s_{0,n}$ are viewed as quantities (existing secrets 610), that can be proactivized, i.e., they are refreshed according to some schedule. The exemplary key rotation framework considers n+1 corresponding independent refreshing schedules $\Sigma_0, \Sigma_1,\ldots,\Sigma_n$, where each $\Sigma_i$ specifies the times where secret $k_0$ (if i=0) or share $s_{0,i}$ (otherwise) must be refreshed. Each schedule $\Sigma_i$ may be event based or time based. In the former case, the secret value is refreshed in arbitrary points in time when a corresponding triggering event occurs, whereas in the latter case refreshing happens regularly, according to a specific period $T_i$ (e.g., every day). It is possible to consider schedules of hybrid type, i.e., a schedule that is primarily time based, but that secondarily allows for emergency secret refreshing whenever certain events occur. For instance, a password share, i.e., a fixed share that takes as value the password of a user, may be scheduled to be refreshed every 90 days (corresponding to standard password update policies), but it can also be updated whenever the user chooses to do so or an administrator suspects that the user's password has leaked to an attacker.

Refreshing Policies 630. A refreshing policy for a secret value $s_{i,j}$ of the ith sharing of the key splitting system optionally specifies whether the secret value should take a particular value in the i+1 sharing. By default, the policy specifies that the secret (key) $s_{i,0}$ remains unchanged, i.e., $s_{i,0}=s_{i+1,0}$, and that a share $s_{i,j}$, j>0, is randomized to $s_{i+1,j}$, where for instance $s_{i+1,j}$ may be $s_{i,j}$ plus some secret random correction term specified by the GenProPBSS protocol. However, the policy may specify that the secret is to be changed to a certain value $s_{i+1,0} \neq s_{i,0}$ or that a share is to be a fixed share and take a predetermined value $s_{i+1,j}$, j>0, that is independent of the secret $s_{i+1,0}$.

Key Rotation Scheduler 650. The key-rotation scheduler is executed by the dealer. Two periods $T_i, T_j$ are overlapping with joint period $T_{i,j}$ if they are synchronized at some point in time and $T_{i,j}$ is their least common multiple. For instance, if $T_i$ is 1 day and T is 7 hours, then they are overlapping with joint period 168 hours. Two refreshing schedules $\Sigma_i, \Sigma_j$ are overlapping if they are time based with periods $T_i, T_j$ that are overlapping with joint period $T_{i,j}$ or event based using the same triggers. The scheduler 650 computes the joint refreshing schedule of refreshing schedules $\Sigma_0, \Sigma_1, \ldots, \Sigma_n$ by identifying the joint periods of them, or events that trigger one or more of updates on secret values $s_{i,j}$ in the ith sharing of the key-splitting system. For each such computed point in time corresponding to new sharing $s_{i+1}$, let $s_{i+1,0}$ be the new secret (key) to be shared, and $s_{i+1,I_1}, s_{i+1,I_2}, \ldots, s_{i+1,I_k}$ be the predetermined values of k fixed shares in the new sharing, where k≤t−2 for PBSS reconstruction threshold t.

Figure 7:
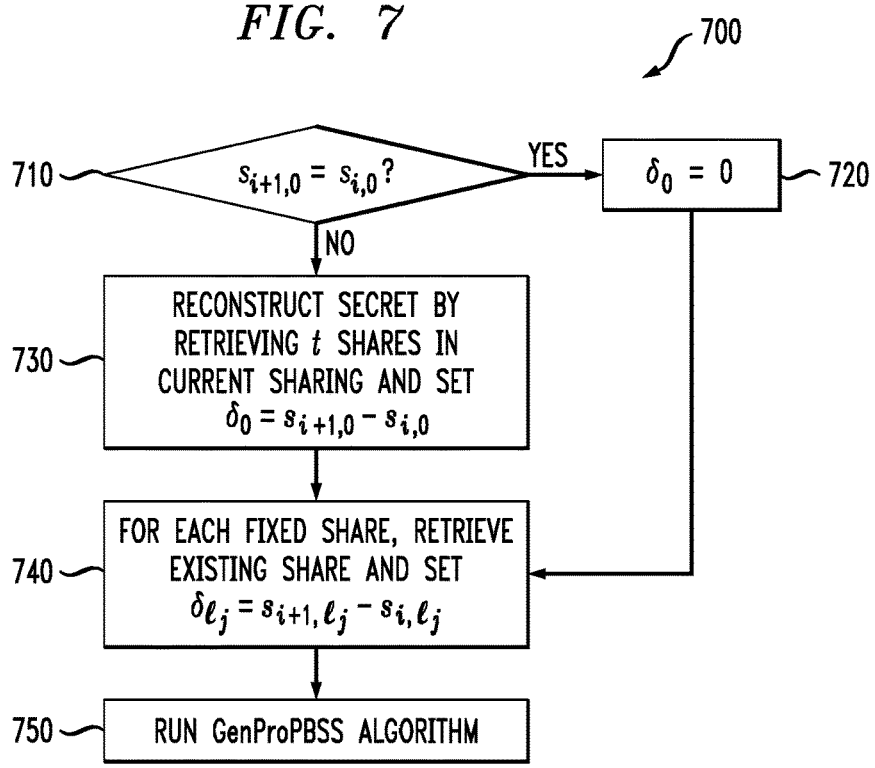
FIG. 7 is a flow chart illustrating an exemplary implementation of a key rotation process according to one embodiment of the invention.

FIG. 7 is a flow chart illustrating an exemplary implementation of a key rotation process 700, according to one embodiment of the invention.

If the refreshing policy of refreshing schedule $\Sigma_0$ (620) specifies that $s_{i+1,0}=s_{i,0}$ (no secret update or key rotation) during step 710, then set $\delta_0=0$ during step 720 (and continue to next step 740); otherwise, during step 730 reconstruct secret $s_{i,0}$ by retrieving t shares in current sharing $S_i$, set $\delta_0=s_{i+1,0}-s_{i,0}$ and proceed to step 740.

For each fixed share $s_{i+1,I_j}$ in sharing $S_{i+1}$, retrieve existing (fixed or non-fixed) share $s_{i,I_j}$ in current sharing $S_i$ during step 740 and set offset $\delta_{I_j}=s_{i+1,I_j}-s_{i,I_j}$.

Run GenProPBSS algorithm during step 750 to share the new secret in sharing $S_i$ with offset $\delta_0$ into n shares with fixed shares $s_{i+1,I_1}, s_{i+1,I_2}, \ldots, s_{i+1,I_k}$ and corresponding offsets $\delta_{I_1}, \delta_{I_2}, \ldots, \delta_{I_k}$.

In the above discussion, for simplicity, but without loss of generality, it is assumed that (a) the refreshing schedules 620 and refreshing policies 630 are consistent with the fixed-share capacity of the GenProPBSS algorithm; and that (b) the refreshing schedules 620 and refreshing policies 630 fully utilize such fixed-share capacity. That is, it is assumed that at each computed point in time corresponding to a new sharing $S_{i+1}$, exactly k fixed shares are needed to be used. In other words, assumption (a) dictates that no more than k fixed shares are needed to be used and assumption (b) dictates that no less than k fixed shares are used. It is noted that these assumptions can be removed. For instance, if assumption (a) is not met, then the key rotation scheduler may decide which k fixed shares will be used, breaking ties either arbitrarily or according to some special "fixed share eviction" policy that, for instance, treats the refreshing policies 630 as having different priorities and choosing to evict the use of fixed shares for those with the lower priorities. Also, if assumption (b) is not met, then in the above discussion, k can be replaced with k'<k, where k' is the number of fixed shares needed in the new sharing; or alternatively, non-fixed shares can be simulated as being fixed shares with offsets that are randomly selected by the scheduler (dealer).

It is noted that in reference to the protocol ProPBSS (e.g., FIGS. 4 and 5) and protocol GenProPBSS and its use by the Key Rotation Scheduler 650 (e.g., FIGS. 6 and 7), what is required as input given to the protocols in order to compute the correction shares consistently with one or more fixed shares and, thus, the new sharing of the secret (or possibly of the updated secret, in the case of protocol GenProPBSS) is the knowledge of the offsets $\delta_i$ as defined in the corresponding protocol descriptions. The current invention supports many ways by which these required offset values may be provided as input to the related underlying ProPBSS or GenProPBSS protocol: (1) The offsets may be provided to the protocol by some external means, e.g., a separate entity may provide the dealer or the scheduler with the offset corresponding to a fixed share or the secret itself; (2) The offsets may be determined by (a) first having the dealer or scheduler reconstructing the current sharing, and thus both the current secret and the current values of the shares that will be fixed in the new sharing, then (b) providing the dealer or scheduler with the desired new values of these fixed shares in the new sharing and possibly the new desired secret or having the dealer or scheduler determining itself these new desired values, and finally (c) computing each corresponding offset as the difference between the new desired value and the current value (of a fixed share or the secret). Accordingly, step 1 in FIGS. 4 and 5 may be omitted if the offsets are directly provided as input to the protocol (and used in step 5). Similarly, existing secrets 610 may be only indirectly provided to the key rotation scheduler 650 in the form of said required offsets. Analogously, Updated Secrets 680 may be only indirectly produced by the Key Rotation Scheduler 650 in the form of correction shares produced by the protocols ProPBSS and GenProPBSS.

Exemplary Refreshing Policies

A number of exemplary refreshing policies provide certain security or usability properties in a key-splitting system that runs in mobile or enterprise environments.

Rotated keys may be interrelated through an unpredictable one-way cryptographic hash function, e.g., $s_{i+1,0}=h(s_{i,0})$, where $h(\cdot)$ is a SHA-1 hash function. This can be useful in supporting versions of past states of credentials protected through this key. For instance, a user may recover its lost state with respect to a previous key $s_{i,0}$ and then employ the hashing function h to recover and synchronize to the current key in the system.

Fixed shares may be used to encode useful information about the state of the current state key splitting system. For instance, a current timestamp may be used as a fixed share in the new sharing, thus fingerprinting the sharing according to the time it was produced.

Newer states in the key splitting system may be interrelated to previous states through chaining of secret keys with secret shares. In particular, a previous key may become a fixed refreshed share in the new sharing of the rotated key.

A conservative and highly secure event based schedule may specify that a share rotates immediately after its very first use for secret reconstruction. This implements a key splitting system with one or more "one-time" shares.

Additional policies may be specified for concrete applications of the above key rotation framework to secure storage (e.g., efficient, secure and flexible content backup and recovery processes or vault data protection).

CONCLUSION

The foregoing applications and associated embodiments should be considered as illustrative only, and numerous other embodiments can be configured using the techniques disclosed herein, in a wide variety of different cryptography applications.

It should also be understood that the secret sharing, protection, proactivization, key rotation and synchronization techniques, as described herein, can be implemented at least in part in the form of one or more software programs stored in memory and executed by a processor of a processing device such as a computer. As mentioned previously, a memory or other storage device having such program code embodied therein is an example of what is more generally referred to herein as a "computer program product."

Authentication processes in other embodiments may make use of one or more operations commonly used in the context of conventional authentication processes. Examples of conventional authentication processes are disclosed in A. J. Menezes et al., Handbook of Applied Cryptography, CRC Press, 1997, which is incorporated by reference herein. These conventional processes, being well known to those skilled in the art, will not be described in further detail herein, although embodiments of the present invention may incorporate aspects of such processes.

The communication system may be implemented using one or more processing platforms. One or more of the processing modules or other components may therefore each run on a computer, storage device or other processing platform element. A given such element may be viewed as an example of what is more generally referred to herein as a "processing device."

Figure 8:
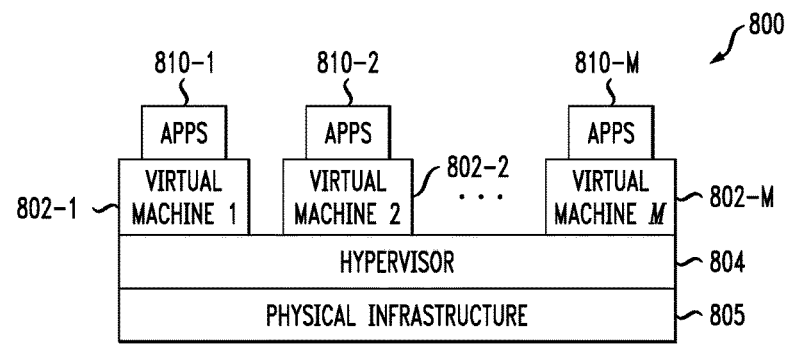
FIG. 8 illustrates an exemplary processing platform that may be used to implement at least a portion of one or more embodiments of the invention comprising a cloud infrastructure.

Referring now to FIG. 8, one possible processing platform that may be used to implement at least a portion of one or more embodiments of the invention comprises cloud infrastructure 800. The cloud infrastructure 800 in this exemplary processing platform comprises virtual machines (VMs) 802-1, 802-2, . . . 802-M implemented using a hypervisor 804. The hypervisor 804 runs on physical infrastructure 805. The cloud infrastructure 800 further comprises sets of applications 810-1, 810-2, . . . 810-M running on respective ones of the virtual machines 802-1, 802-2, . . . 802-M under the control of the hypervisor 804.

The cloud infrastructure 800 may encompass the entire given system or only portions of that given system, such as one or more of client, servers, controller, authentication server or relying server in the system.

Although only a single hypervisor 804 is shown in the embodiment of FIG. 8, the system may of course include multiple hypervisors each providing a set of virtual machines using at least one underlying physical machine.

An example of a commercially available hypervisor platform that may be used to implement hypervisor 804 and possibly other portions of the system in one or more embodiments of the invention is the VMware® vSphere™ which may have an associated virtual infrastructure management system, such as the VMware® vCenter™. The underlying physical machines may comprise one or more distributed processing platforms that include storage products, such as VNX™ and Symmetrix VMAX™, both commercially available from EMC Corporation of Hopkinton, Mass. A variety of other storage products may be utilized to implement at least a portion of the system.

Figure 9:
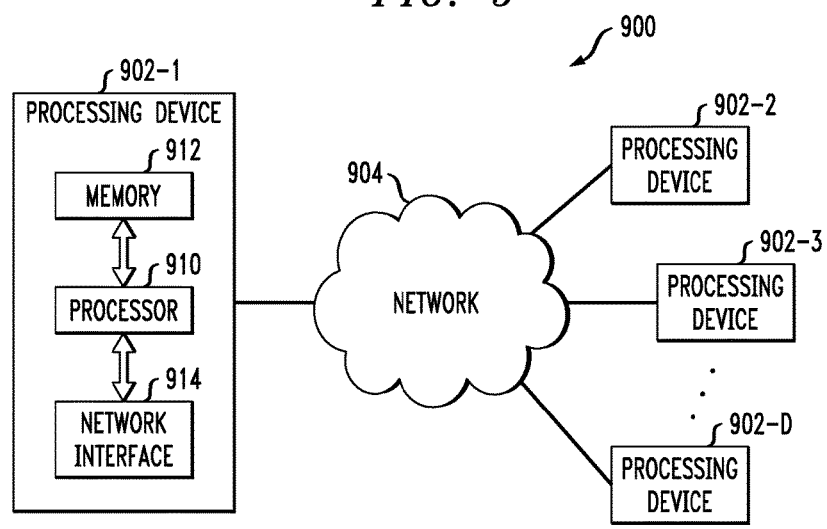
FIG. 9 illustrates another exemplary processing platform that may be used to implement at least a portion of one or more embodiments of the invention.

Another example of a processing platform is processing platform 900 shown in FIG. 9. The processing platform 900 in this embodiment comprises at least a portion of the given system and includes a plurality of processing devices, denoted 902-1, 902-2, 902-3, . . . 902-D, which communicate with one another over a network 904. The network 904 may comprise any type of network, such as a wireless area network (WAN), a local area network (LAN), a satellite network, a telephone or cable network, a cellular network, a wireless network such as WiFi or WiMAX, or various portions or combinations of these and other types of networks.

The processing device 902-1 in the processing platform 900 comprises a processor 910 coupled to a memory 912. The processor 910 may comprise a microprocessor, a microcontroller, an application specific integrated circuit (ASIC), a field programmable gate array (FPGA) or other type of processing circuitry, as well as portions or combinations of such circuitry elements, and the memory 912, which may be viewed as an example of a "computer program product" having executable computer program code embodied therein, may comprise random access memory (RAM), read only memory (ROM) or other types of memory, in any combination.

Also included in the processing device 902-1 is network interface circuitry 914, which is used to interface the processing device with the network 904 and other system components, and may comprise conventional transceivers.

The other processing devices 902 of the processing platform 900 are assumed to be configured in a manner similar to that shown for processing device 902-1 in the figure.

Again, the particular processing platform 900 shown in the figure is presented by way of example only, and the given system may include additional or alternative processing platforms, as well as numerous distinct processing platforms in any combination, with each such platform comprising one or more computers, storage devices or other processing devices.

Multiple elements of system may be collectively implemented on a common processing platform of the type shown in FIG. 8 or 9, or each such element may be implemented on a separate processing platform.

As is known in the art, the methods and apparatus discussed herein may be distributed as an article of manufacture that itself comprises a computer readable medium having computer readable code means embodied thereon. The computer readable program code means is operable, in conjunction with a computer system, to carry out all or some of the steps to perform the methods or create the apparatuses discussed herein. The computer readable medium may be a tangible recordable medium (e.g., floppy disks, hard drives, compact disks, memory cards, semiconductor devices, chips, application specific integrated circuits (ASICs)) or may be a transmission medium (e.g., a network comprising fiber-optics, the world-wide web, cables, or a wireless channel using time-division multiple access, code-division multiple access, or other radio-frequency channel). Any medium known or developed that can store information suitable for use with a computer system may be used. The computer-readable code means is any mechanism for allowing a computer to read instructions and data, such as magnetic variations on a magnetic media or height variations on the surface of a compact disk.

It should again be emphasized that the above-described embodiments of the invention are presented for purposes of illustration only. Many variations and other alternative embodiments may be used. For example, the techniques are applicable to a wide variety of other types of cryptographic devices and authentication systems that can benefit from the secret sharing, protection, proactivization, key rotation and synchronization techniques as disclosed herein. Also, the particular configuration of communication system and processing device elements shown herein, and the associated authentication techniques, can be varied in other embodiments. Moreover, the various simplifying assumptions made above in the course of describing the illustrative embodiments should also be viewed as exemplary rather than as requirements or limitations of the invention. Numerous other alternative embodiments within the scope of the appended claims will be readily apparent to those skilled in the art.

What is claimed is:

1. A method, comprising:
   determining a difference between an updated value of a share and a prior value of said share for at least one party, wherein said updated value comprises a fixed share that is one of a plurality of shares of a secret, wherein said plurality of shares are held by a plurality of parties, wherein said fixed share is based on a predetermined fixed value;
   setting, using at least one processing device, at least one polynomial coefficient of a correction polynomial employed by a polynomial-based secret sharing scheme to a value that depends on the difference;
   applying, using said at least one processing device, said polynomial-based secret sharing scheme to obtain a plurality of share correction values, wherein said plurality of share correction values comprises a share correction value for said fixed share, wherein said share correction value is derived from said at least one polynomial coefficient; and
   providing, using said at least one processing device, said share correction values to at least one of said parties, wherein said at least one party generates said fixed share from said provided share correction value for said fixed share and said prior value of said share.

2. The method of claim 1, wherein said difference is zero.

3. The method of claim 1, wherein said fixed share is based on one or more of secret information related to said at least one party and a password of said at least one party.

4. The method of claim 3, wherein said at least one polynomial coefficient depends on a value obtained by applying a compressed-range function to said one or more of said secret information related to said at least one party and said password of said at least one party.

5. The method of claim 1, wherein said secret protects at least one data item.

6. The method of claim 1, wherein said at least one polynomial coefficient further depends on a random value.

7. The method of claim 1, further comprising the step of setting a second polynomial coefficient of said correction polynomial to be equal to zero.

8. The method of claim 1, wherein t shares comprise a minimal authorized set needed for reconstruction of said secret and wherein said t shares must be obtained to reconstruct said secret.

9. The method of claim 1, wherein said determining step comprises determining a plurality of differences for a second plurality of shares held by a second plurality of parties that is a subset of said plurality of parties, wherein each of said differences of said plurality of differences comprises a difference between an updated value of a corresponding share in said second plurality of shares and a prior value of said corresponding share, wherein said updated values of said second plurality of shares comprise a plurality of fixed shares, wherein said setting step comprises setting a plurality of said correction polynomial coefficients in a manner that depends on said plurality of differences, wherein said plurality of share correction values comprises share correction values for said plurality of fixed shares that depend on said plurality of correction polynomial coefficients.

10. The method of claim 9, wherein said setting step further comprises setting at least one polynomial coefficient of said correction polynomial to a value that depends on a difference between an updated value of said secret and a prior value of said secret, wherein said plurality of share correction values depends on at least two of said polynomial coefficients, wherein at least one party generates a refreshed share from said provided share correction value, and wherein said at least one refreshed share corresponds to an updated secret defined by said updated value of said secret.

11. The method of claim 10, wherein said setting step is performed by a key rotation scheduler based on said differences determined for one or more of said updated value of said secret and one or more of said plurality of shares, wherein said plurality of correction shares and said at least one generated refreshed share comprise a new sharing of one or more of said secret and said updated secret.

12. The method of claim 11, wherein said key rotation scheduler performs said new sharing of said one or more of said secret and said updated secret based on one or more of a refreshing schedule and a refreshing policy for said secret.

13. The method of claim 12, wherein said refreshing schedule comprises independent schedules for each of said secret and said shares, indicating one or more of when said secret should be updated and when one or more of said shares should be refreshed.

14. The method of claim 12, wherein said refreshing policy indicates whether said secret and said shares should take a particular value for a next sharing of said one or more of said secret and said updated secret corresponding to said polynomial-based secret sharing scheme.

15. The method of claim 12, wherein said secret comprises a cryptographic key, said new sharing comprises a rotation of said key and said shares, and wherein said refreshing policy indicates that one or more of (i) a plurality of rotated keys are interrelated through an unpredictable one-way cryptographic hash function; (ii) one or more fixed shares are used to encode information about a current state of the polynomial-based secret sharing scheme; (iii) next states in the polynomial-based secret sharing scheme are interrelated to prior states through a chaining of secret keys with said shares; and (iv) one or more shares rotate substantially immediately after a first use of said share for secret reconstruction.

16. A non-transitory machine-readable recordable storage medium, wherein one or more software programs when executed by one or more processing devices implement the following steps:
determining a difference between an updated value of a share and a prior value of said share for at least one party, wherein said updated value comprises a fixed share that is one of a plurality of shares of a secret, wherein said plurality of shares are held by a plurality of parties, wherein said fixed share is based on a predetermined fixed value;
setting, using at least one processing device, at least one polynomial coefficient of a correction polynomial employed by a polynomial-based secret sharing scheme to a value that depends on the difference;
applying, using said at least one processing device, said polynomial-based secret sharing scheme to obtain a plurality of share correction values, wherein said plurality of share correction values comprises a share correction value for said fixed share, wherein said share correction value is derived from said at least one polynomial coefficient; and
providing, using said at least one processing device, said share correction values to at least one of said parties, wherein said at least one party generates said fixed share from said provided share correction value for said fixed share and said prior value of said share.

17. An apparatus, comprising:
a memory; and
at least one hardware device, coupled to the memory, operative to implement the following steps:
determining a difference between an updated value of a share and a prior value of said share for at least one party, wherein said updated value comprises a fixed share that is one of a plurality of shares of a secret, wherein said plurality of shares are held by a plurality of parties, wherein said fixed share is based on a predetermined fixed value;
setting, using at least one processing device, at least one polynomial coefficient of a correction polynomial employed by a polynomial-based secret sharing scheme to a value that depends on the difference;
applying, using said at least one processing device, said polynomial-based secret sharing scheme to obtain a plurality of share correction values, wherein said plurality of share correction values comprises a share correction value for said fixed share, wherein said share correction value is derived from said at least one polynomial coefficient; and
providing, using said at least one processing device, said share correction values to at least one of said parties, wherein said at least one party generates said fixed share from said provided share correction value for said fixed share and said prior value of said share.

18. The apparatus of claim 17, wherein said fixed share is based on one or more of secret information related to said at least one party and a password of said at least one party.

19. The apparatus of claim 17, wherein said determining step comprises determining a plurality of differences for a second plurality of shares held by a second plurality of parties that is a subset of said plurality of parties, wherein each of said differences of said plurality of differences comprises a difference between an updated value of a corresponding share in said second plurality of shares and a prior value of said corresponding share, wherein said updated values of said second plurality of shares comprise a plurality of fixed shares, wherein said setting step comprises setting a plurality of said correction polynomial coefficients in a manner that depends on said plurality of differences, wherein said plurality of share correction values comprises share correction values for said plurality of fixed shares that depend on said plurality of correction polynomial coefficients.

20. The apparatus of claim 19, wherein said setting step further comprises setting at least one polynomial coefficient of said correction polynomial to a value that depends on a difference between an updated value of said secret and a prior value of said secret, wherein said plurality of share correction values depends on at least two of said polynomial coefficients, wherein at least one party generates a refreshed share from said provided share correction value, and wherein said at least one refreshed share corresponds to an updated secret defined by said updated value of said secret.

21. The apparatus of claim 20, wherein said setting step is performed by a key rotation scheduler based on said differences determined for one or more of said updated value of said secret and one or more of said plurality of shares, wherein said plurality of correction shares and said at least one generated refreshed share comprise a new sharing of one or more of said secret and said updated secret.

22. The apparatus of claim 21, wherein said key rotation scheduler performs said new sharing of said one or more of said secret and said updated secret based on one or more of a refreshing schedule and a refreshing policy for said secret.

23. The apparatus of claim 22, wherein said refreshing schedule comprises independent schedules for each of said secret and said shares, indicating one or more of when said secret should be updated and when one or more of said shares should be refreshed.

24. The apparatus of claim 22, wherein said refreshing policy indicates whether said secret and said shares should take a particular value for a next sharing of said one or more of said secret and said updated secret corresponding to said polynomial-based secret sharing scheme.

25. The apparatus of claim 22, wherein said secret comprises a cryptographic key, said new sharing comprises a rotation of said key and said shares, and wherein said refreshing policy indicates that one or more of (i) a plurality of rotated keys are interrelated through an unpredictable one-way cryptographic hash function; (ii) one or more fixed shares are used to encode information about a current state of the polynomial-based secret sharing scheme; (iii) next states in the polynomial-based secret sharing scheme are interrelated to prior states through a chaining of secret keys with said shares; and (iv) one or more shares rotate substantially immediately after a first use of said share for secret reconstruction.

* * * * *